US006012876A

United States Patent [19]

Kumar

[11] Patent Number: 6,012,876
[45] Date of Patent: Jan. 11, 2000

[54] SWIRL CHAMBER IN PNEUMATIC FORWARDING TUBE SYSTEMS

[76] Inventor: Ajaya Kumar, P.O.Box 4563 First floor, V-8, Green Park Extension, New Delhi, India, 110016

[21] Appl. No.: 08/855,855

[22] Filed: May 12, 1997

[51] Int. Cl.[7] ..................... B65G 51/18

[52] U.S. Cl. ..................... 406/191; 406/195

[58] Field of Search ..................... 406/195, 191

[56] References Cited

U.S. PATENT DOCUMENTS

| | | | |
|---|---|---|---|
| 411,864 | 10/1889 | Leaycraft | 406/195 |
| 4,595,319 | 6/1986 | Cook | 406/195 |

*Primary Examiner*—William E. Terrell
*Assistant Examiner*—Richard Ridley
*Attorney, Agent, or Firm*—Larson & Taylor

[57] ABSTRACT

A swirl or pitch changing chamber (16) is interposed at the convergence of a plurality of divergent pneumatic forwarding tubes (11, 12) and communicates with the tubes (11, 12). In the chamber (16), a transporter capsule (15) is caused to perform a complex motion, the motion being predominantly a pitch changing translation, by use of mechanical, electromagnetic, magnetic and/or pneumatic forces caused to act on the capsule (15), thereby accomplishing a desired change in the direction of longitudinal travel of the capsule (15). The chamber (16) is defined by an enlargement in the transverse dimension of the tubes (11, 12), the dimensions of the chamber (16) being sufficient to accommodate the complex motion.

15 Claims, 5 Drawing Sheets

SWIRL CHAMBER IN PNEUMATIC FORWARDING TUBE SYSTEMS

BACKGROUND OF THE INVENTION

This invention is in the field concerning pneumatic tube systems for forwarding transporter capsules. More specifically, the invention relates to accomplishing a swerve (change in pitch) in the direction of travel of the transporter capsule at bends in the pneumatic forwarding tube systems.

Hitherto, in pneumatic forwarding tube systems for forwarding of transporter capsules, a desired swerve in the direction of longitudinal travel of a transporter capsule, the swerve (change in pitch) being an angular displacement of 90 degrees or any other functionally necessary angular displacement in the travel, is effected by means of the capsule performing a curvilinear motion while the capsule transits through an arcuate bend in the tube, the bend being coincident with the desired swerve. This bend cannot be in the shape of a sharp turn, but curvature of the bend has necessarily to be in the shape of a gradual arc, with a radius of curvature of the arc being adequately large to allow the straight length of dimension of the capsule and diametrical dimension of the capsule to pass curvilinearly through the bend in the tube.

This large radius of the bend occupies a relatively large physical area. The area required is often not easily available at the site of installation of the system. Often space is also expensive at the site. Therefore the physical area required for achieving the swerve should be minimal.

In some conventional systems, a lateral cylindrical recess is necessary at the middle of midriff region of the capsule so as to accommodate the convex inside tube surface at the bend. With this construction, convexity of the inside tube surface protrudes into the recess when the capsule traverses the bend.

The recess constricts the transverse cross-sectional diametrical dimension of the capsule at the midriff region. As cargo carried inside the capsule is constrained to the internal diameter of the capsule at the constricted midriff, the recess reduces the volumetric cargo transporting capacity of the capsule. A uniform cylinder shaped cargo cannot have a diameter greater than the minimum internal diameter at the midriff, whereby cylinder capacity of the capsule is defined by the diameter and length of a uniform cylinder than can be contained inside the capsule.

The cross-sectional internal diameter of the tube forwarding the capsule then matches the outermost diameter of the capsule, which is appreciably larger than cross-sectional internal diameter at the constricted midriff of the capsule. It is easy to see that expensive space inside the tube is not well utilized for transporting cargo, the cargo being constrained to the constricted midriff. For example, in existing systems a forwarding tube of 90 mm cross-sectional internal diameter can carry a cylinder shaped cargo of 60 mm diameter only.

In conventional tube forwarding systems, straight length overall dimension of the capsule has to be limited so as to allow the capsule to dimensionally pass through the bend in the tube, thereby limiting volumetric cargo transporting capacity of the system. For example, hitherto a tube internal cross-sectional diameter of 90 mm and a bend of as large as 750 mm radius can forward a capsule of only 320 mm length.

In coventional systems, particular cylinder capacities of the capsule can be transported if the system has a minimum diameter of the tube and a minimum radius at the bend as stated in Table 1, in mm.

TABLE 1

| Cylinder Capacity of Capsule: Diameter × Length | Tube Diameter | Bend Radius |
|---|---|---|
| 39 × 225 | 63 | 550 |
| 60 × 245 | 90 | 650 |
| 60 × 320 | 90 | 750 |
| 80 × 245 | 110 | 650 |
| 90 × 415 | 132 | 1000 |

The device according to the present invention obviates the above disadvantages and also provides new and desirable features.

BRIEF SUMMARY OF THE INVENTION

Typical curvilinear longitudinal motion of the capsule at a bend in conventional pneumatic forwarding tube systems is substituted in the pneumatic tube forwarding system of the invention by a complex motion of the capsule in a swirl chamber. The chamber is interposed at the convergence of a plurality of divergent pneumatic tubes, with the tubes proceeding from the chamber in different directions. The complex motion is predominantly a swirling swerve (a pitch changing translation) of the capsule, wherein the capsule is caused to swirl (pitch) during the overall swerve (translation) of the capsule in the chamber. The chamber is defined by an enlargement in the cross sectional tube dimension. The enlargement is dimensionally adequate to accommodate the swirling swerve of the capsule in the chamber, and the chamber obviously communicates with the forwarding tubes.

OBJECTS AND ADVANTAGES

Objectives of the invention are, in pneumatic tube forwarding systems, to lessen the physical area needed to accomplish a desired swerve (change) in the direction of longitudinal travel of the transporter capsule, to diminish the cross-sectional internal diameter of the tube needed for forwarding a cargo of a given diameter and length, and to increase the volumetric transporting capacity of capsule.

Considered itemwise, objects and advantages of the invention are, in a pneumatic forwarding tube system:

- (a) to provide a method and device whereby a dimensionally smaller bending area is required to effect a desired swerve in the direction of the longitudinal travel of a cargo transporter capsule;
- (b) to forward a capsule of longer length in a given bending area dimension than was hitherto possible;
- (c) to forward a capsule of larger diameter than was hitherto possible in a given bending area dimension;
- (d) to eliminate the need for a constricted midriff of the capsule;
- (e) to eliminate the need for unwieldy tube bends of large bending radii;
- (f) to enhance aesthetics, substituting unsightly tube bends with compact swirl chambers in the system; and
- (g) to permit smaller internal diameter tubes to be used for longitudinally forwarding a cylinder capacity.

Still further objects and advantages of the invention will become apparent from a consideration of the ensuing description with reference to accompanying drawings.

BRIEF DESCRIPTION OF THE DRAWINGS

In the accompanying drawing figures the invention has been illustrated by way of a non-limiting example.

DETAILED DESCRIPTION OF THE INVENTION

Figure 1:
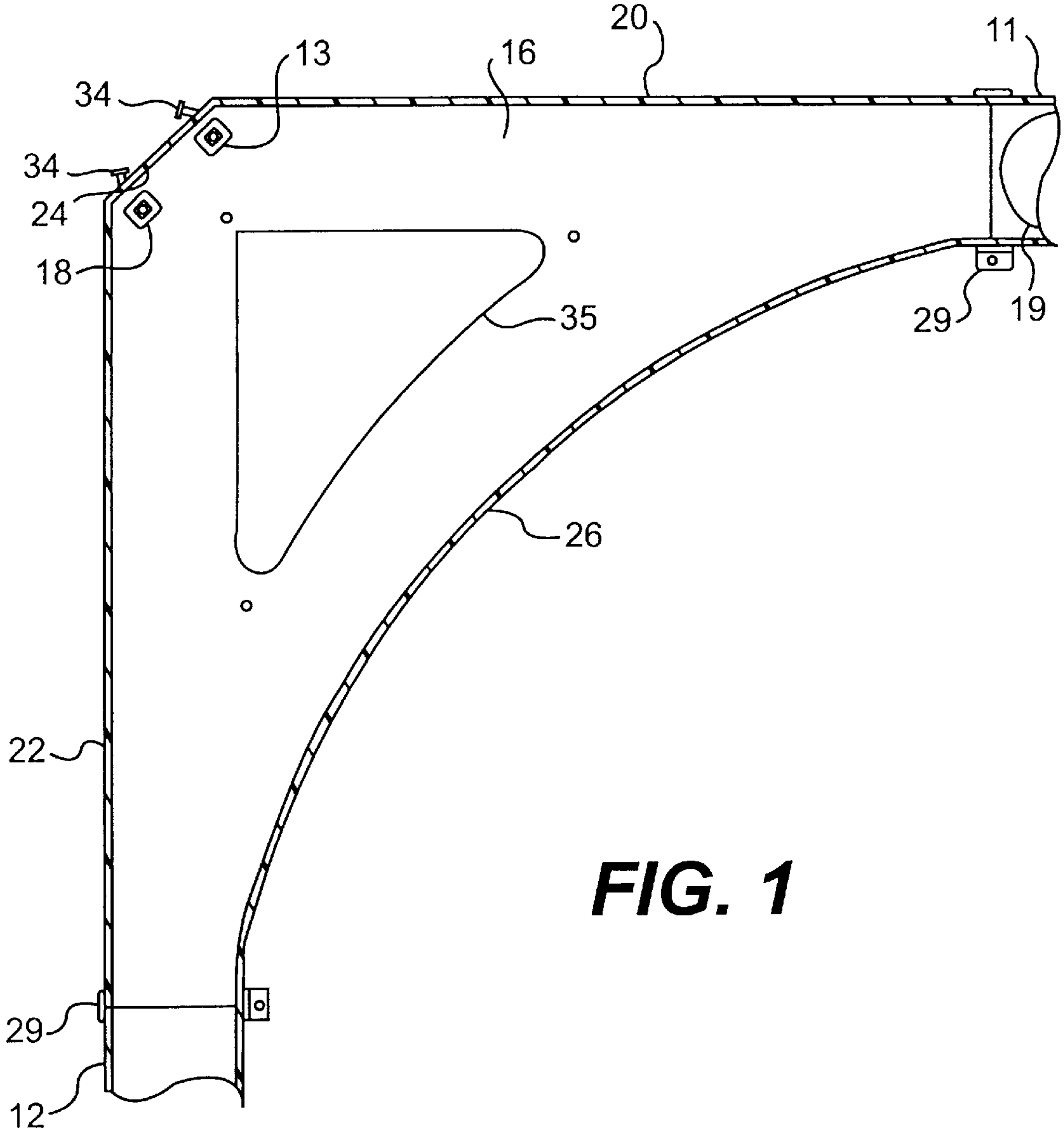
FIG. 1 shows schematically in a longitudinal section view a preferred embodiment of the swirl chamber of the present invention.
Figure 2:
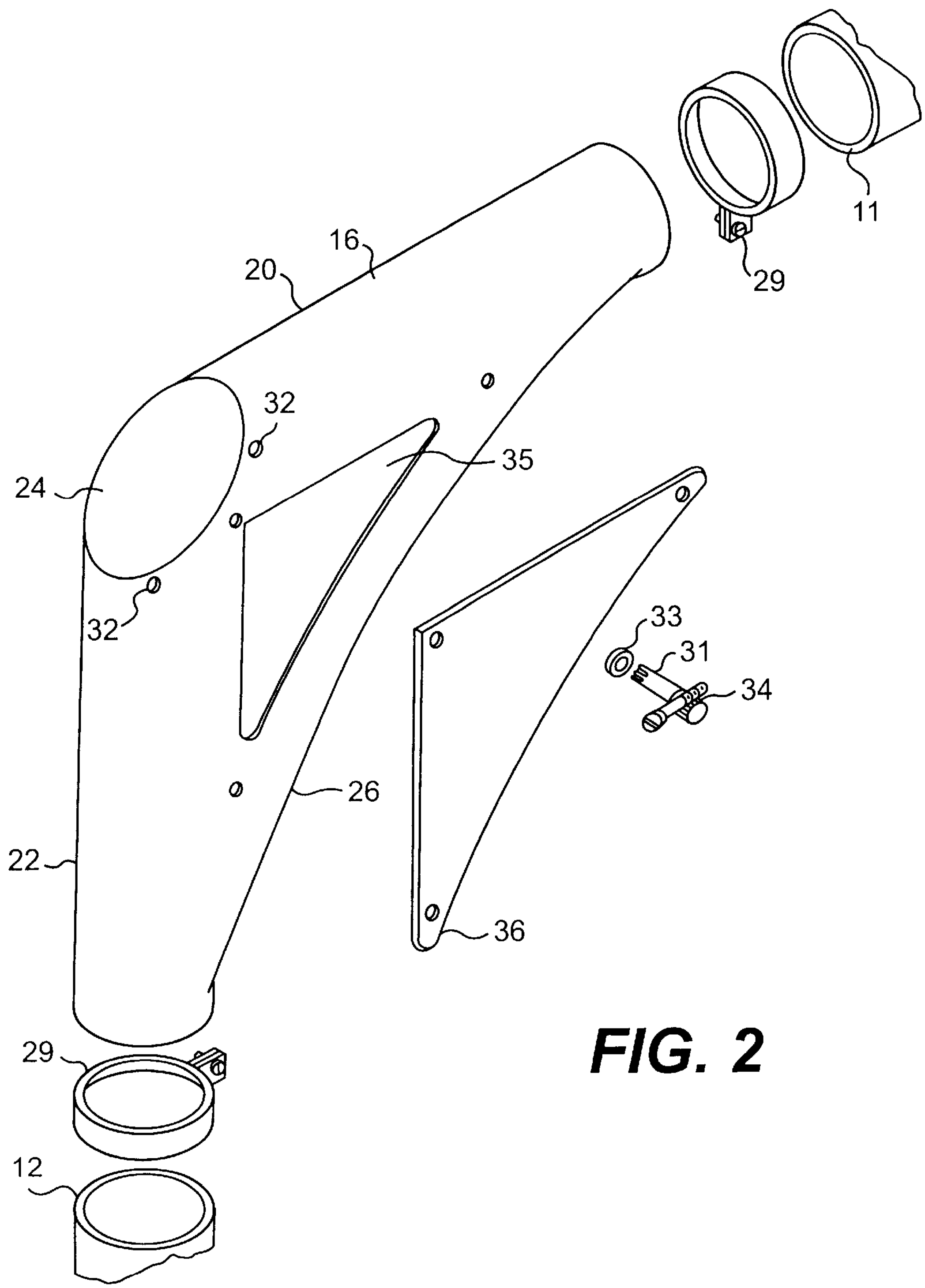
FIG. 2 shows an exploded perspective view of the device of FIG. 1.

In the depicted example, pneumatic suction tube 12 lies below and at right angles to pneumatic pressure tube 11. Tubes 11 and 12 have uniform 66 mm bores, are made of hard, rigid, straight, imperforate, circular cross section, moulded polyvinyl chloride, and have a 2 mm wall thickness. Tubes 11 and 12 provide a sliding fit on the outermost cylindrical surface of seals 17 on cargo transporter capsule 15.

The capsule 15 comprises a hollow, rigid, straight, and opaque polycarbonate moulded cylinder, encapped on each of its two ends by a screw-on 2 mm wall thickness, substantially hemispherical, outwardly polished, smooth surfaced convex and inwardly concave hollow cap 19. Two VELCRO® (hook and loop fasteners) flat band, 10 mm wide, 1 mm radially thick, seals 17 encircle the external cylindrical surface of the capsule 15 and are firmly attached thereto by adhesive means. Each seal 17 is placed 10 mm away from the respective end of the cylinder. In the example, the capsule 15 has external overall dimensions of 66 mm diameter and 324 mm length, and has internally a 60 mm diameter and a 320 mm length.

The capsule 15 carries by design a cargo of computer stationery weighing up to 1 Kg in the example, but the capsule 15 could be carrying other cargos like production, laboratory or medical samples, medicines, spare parts, small items, money, documents or statements.

Interposed at the convergence region of the divergent tubes 11 and 12 is a 2 mm wall thickness, moulded polycarbonate chamber 16 in a cross-sectional shape of a flat enlargement of the tube cross section in a vertical transverse direction. In horizontal transverse direction, the chamber 16 has substantially the same dimensions as the tubes 11, 12, and the chamber 16 communicates with the tubes 11 and 12.

Straight, hollow, inwardly concave, outwardly convex, 334 mm long semicylinder portions 20 and 22 are identical in cross sectional dimensions to the corresponding cross sectional dimensions of the tubes 11, 12, respectively. Semicylinder portions 20 and 22 are longitudinally aligned with and respectively butting end to end with the corresponding outer semicylinder end portions of the respective tubes 11, 12. Thereafter, semicylinder portions 20 and 22 shape the outer mutually perpendicular upper and sideward extremities of the shell of the chamber 16, with a junction 24 of the upper and sideward extremities of the shell being bevelled, and 48 mm in length in the example.

The lower inner underside of the chamber 16 is a sloping longitudinally arcuate semicylinder portion 26. The radius of curvature of the longitudinal arc of semicylinder portion 26 is 1.5 times the overall length of the capsule 15, being in the example 486 mm. The apex of the arc protruding into the underside of the chamber 16 extends to an extent equal to the overall diameter of the capsule 15, 66 mm in the example. The cross section of the semicylinder portion 26 is a semicircle of diameter equal to the diameter of the tubes 11 and 12, with the concavity of the semicircle facing the chamber 16.

The left extremity of the semicylinder portion 26 and the lower extremity of the semicylinder portion 22 meet to form a transverse tubular opening into the chamber 16 identical to the cross section of the tube 12, and likewise the right extremities of the semicylinder portions 20 and 26 meet to form a transverse tubular opening of the chamber 16 identical to the cross section of the tube 11.

The transverse cross sectional end of the respective tubes 11, 12 adjacent to the chamber 16 butts end on end with the respective transverse tubular opening of the chamber 16, and this respective butting is firmly clasped and sealed by a lap sleeve tube mounting clamp 29.

A lateral triangular inspection opening 35 is cut out in each of both the flat parallel vertical side walls of the shell of the chamber 16. The openings 35 are closed air tight by a pair of flat, parallel, vertical, transparent, polycarbonate, and 2 mm thick sheet covers 36. Each of the covers 36 is screw attached on the respective side walls of the shell of the chamber 16 by three screws tightened into threaded holes in the side wall, with the screws not protruding into the chamber 16.

Meeting points of adjacent arcs and meeting lines of adjacent surfaces comprising the walls of the chamber 16 are smoothened and chamfered wherever necessary in moulding of the chamber 16 so as to avoid any rough edges protruding into the internal space of the chamber 16.

Overall the chamber 16 measures 400×400×74 mm in the example.

A moulded, synthetic hard rubber, flat surfaced, 3 mm thick sheet having a surface 13 is affixed around a mild steel, 10 mm cuboid base 14 by ARALDITE adhesive from M/S Ciba AG of Switzerland. The base 14 has a toothed, lateral, 5 mm through bore 28 into either end which meshes respectively with a tooth ribbed, 5 mm diameter, 4.5 mm length portion of a shaft 31. Each of a pair of the shafts 31 slide horizontally through a 6 mm aperture 32 in a respective side of the shell of the chamber 16. The aperture 32 is made airtight by a rubber seal 33. The two shafts 31 are rotatable together on an axis of the respective bore 28 by a simultaneously operated pair of worm wheels 34 placed outside of the shell of the chamber 16 on either side of the shell. The top end of the flat surface 13 is positioned inside the chamber 16 opposite the tube 11 below the inside upper edge of the chamber 16 at a distance of 330 mm from the butting end of the tube 11. The slope of the surface 13 with respect to axis of the tube 11 is variably manipulated and set between 40 and 50 degrees by the pair of worm wheels 34.

In the example, the manipulation is effected manually, but in an alternative configuration the manipulation can be effected by means of a software operated microprocessor controlled by an electric motor or electromagnet.

A flat surface 18, similar to the surface 13, is likewise positioned opposite the tube 12 inside the chamber 16 and manipulated from outside the chamber 16.

Air pressure or suction for propelling the capsule 15 is furnished by a three phase regenerative type electric motor driven centrifugal blowers delivering forwarding force-related low to medium pressure air. The blowers have multistage regenerative impellers with acoustic levels of less than 75 dB at 1 meter distance. It is also envisaged that the blowers are further provided with an air filter, an air volume regulating throttle, a switch off and a reversal arrangement to control the momentum with which the capsule 15 arrives at a destination in the system.

Operation

The capsule 15 is caused to perform a complex motion in the chamber 16, the motion being predominantly a swirling swerve (pitch changing translation). This motion is initiated in the example by rebound of the leading cap 19 of the capsule 15 on the inclined deflecting surface 13. The sequence of operation is as follows.

Figure 4:
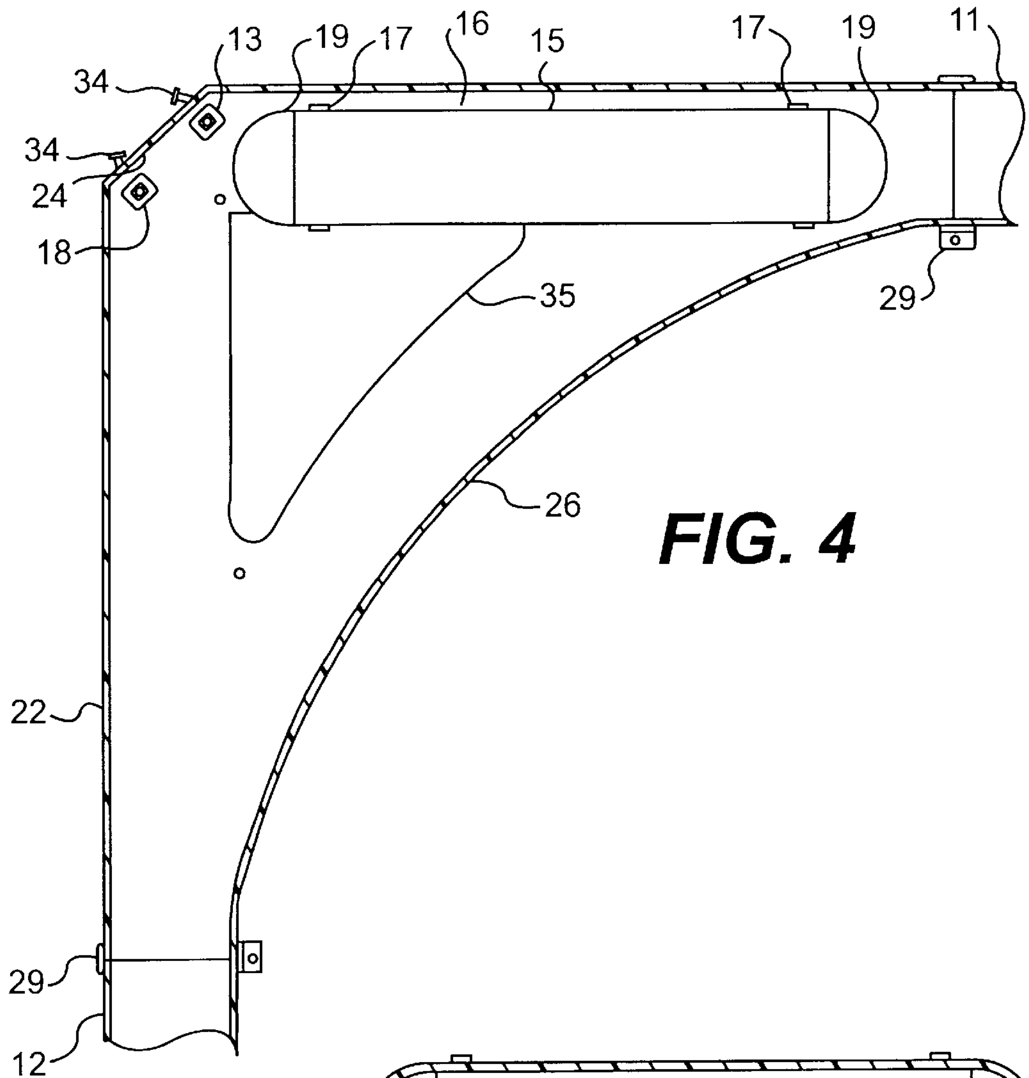
FIG. 4 shows schematically a sectional view of a capsule after it emerges from a pressure tube and into a swirl chamber of the present invention.
Figure 3:
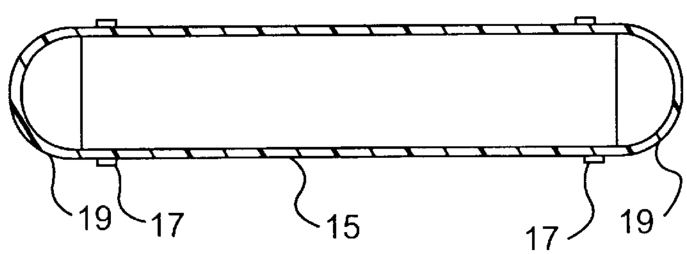
FIG. 3 shows schematically in a longitudinal section view a transporter capsule.

The transporter capsule 15, initially travelling at a longitudinal speed of up to 12 meters per second in the tube 11, is ejected from the tube 11 into the chamber 16. Conventional air braking and air cushion techniques are employed by controlling functioning of the air compressors delivering air in the system to regulate the speed at which the capsule 15 arrives into the chamber 16. In the example, the capsule 15 is caused to arrive in the chamber 16 at a speed of 1 meter per second in FIG. 4.

After emergence of the capsule 15 out of the tube 11 into the chamber 16, the leading cap 19 of the capsule 15 hits on the surface 13, thereby rebounding. The angularity subtended by the surface 13 to the direction of initial motion of the capsule 15 is manipulated and set by the worm wheel 34.

The angularity of impact of the leading cap 19 on the surface 13 results in an angular displacement of the longitudinal pitch of the leading cap 19. This displacement is about twice the angle subtended between the line of incidence of the leading cap 19 on the surface 13 and the normal to the surface 13 at the point of impact of the leading cap 19 on the surface 13. Consequently, the leading cap 19 moves downwards after deflection from the surface 13, thereby causing the capsule 15 to dip (pitch) and swerve.

At the rear end of the capsule 15, the trailing cap 19 tends to continue moving by momentum along its initial direction of motion, so far as the trailing cap 19 does not meet with any collision. Thereby the capsule 15 as a whole swirls (pitches) as it swerves (moves) in the chamber 16. The capsule 15 is simultaneously pulled downwards under action of the downward movement of the leading cap 19.

Figure 5:
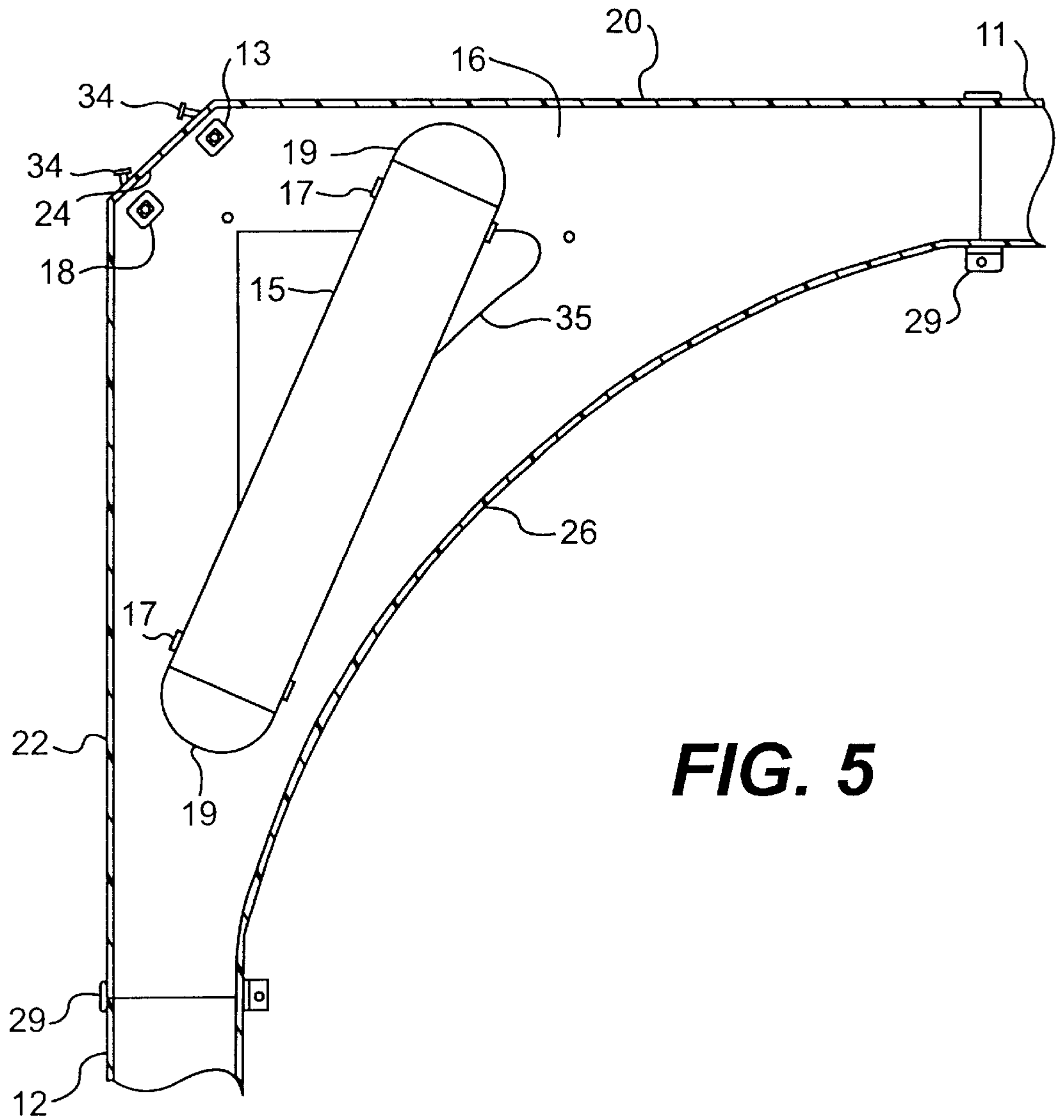
FIG. 5 shows schematically a sectional view of the capsule subsequent to impact on the deflecting surface of the swirl chamber.

Multiple rebounds of the capsule 15 on the walls inside the chamber 16 can occur, dependent upon momenta of the cargo carrying capsule 15. At each impact, the angle of deflection is approximately equal to angle of incidence. Position of the capsule 15 at one such instant is depicted in FIG. 5.

Figure 6:
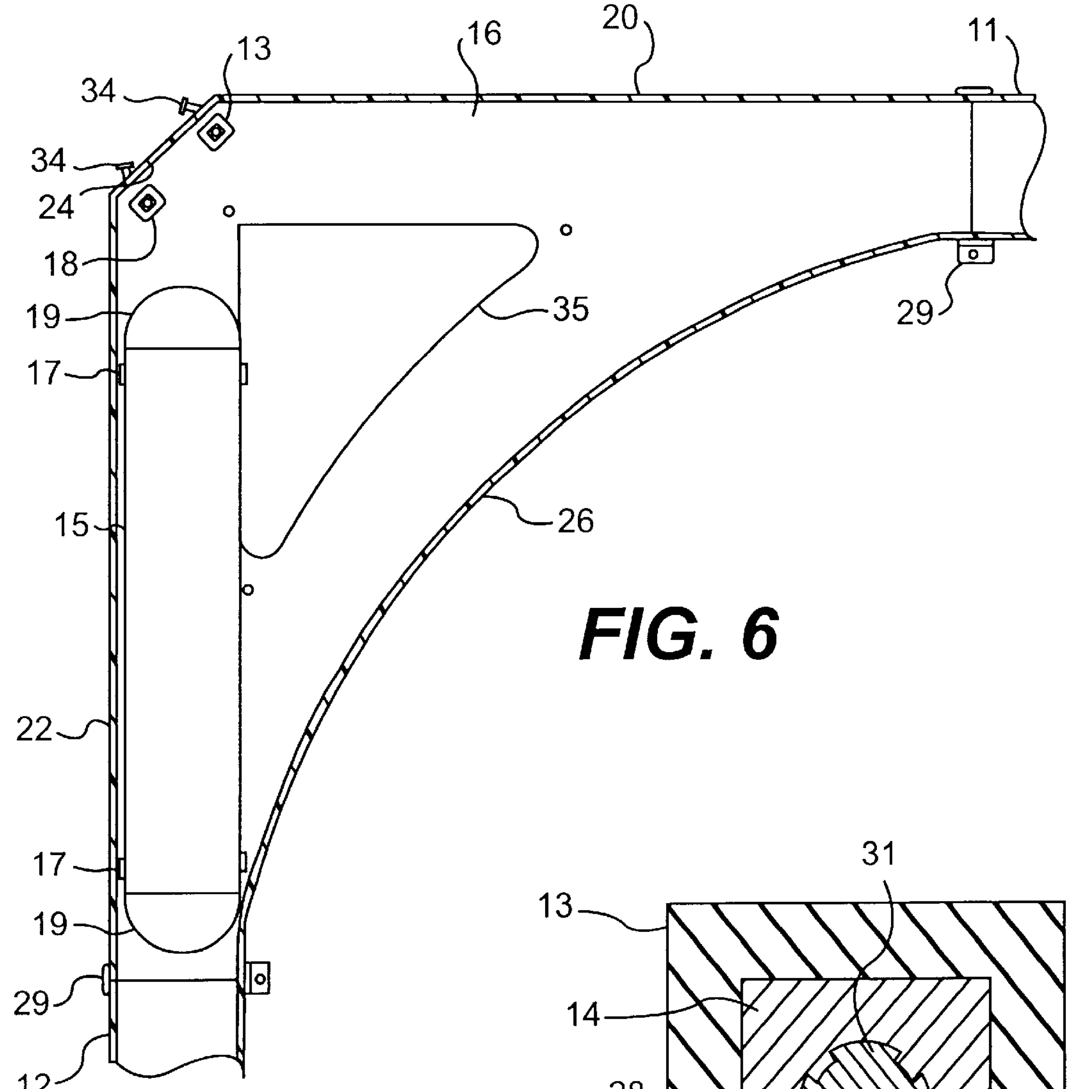
FIG. 6 shows schematically a sectional view of the capsule prior to entry into suction tube and exit from the swirl chamber.
Figure 7:
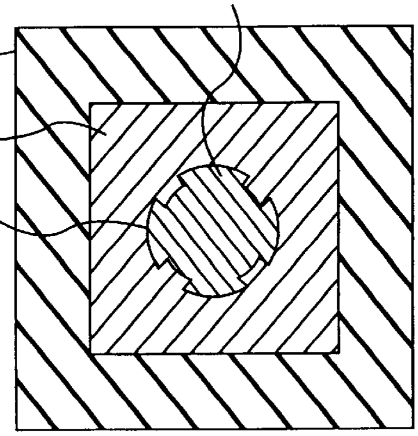
FIG. 7 is an enlarged cross sectional view of a deflecting surface of the swirl chamber.

Immediately after the dip motion has taken place, air suction towards the tube 12 is escalated to a maxima by controlling the compressors and the air movement in the system. Suction of the tube 12 pulls the capsule 15 towards the tube 12, and finally the capsule 15 moves, as depicted in FIG. 6, along the direction of, and into, the tube 12.

Conclusions, Scope and Ramifications

Table 2 depicts dimensional achievements as a function of cylinder capacity for conventional systems and for the system of the invention, in mm.

TABLE 2

| Cylinder Capacity of Capsule (dia × L) | In conventional systems: Tube (dia.) | Bend (radius) | Bend Area (L × H) | In my system: Tube (dia.) | Bend area (L × H) |
|---|---|---|---|---|---|
| 39 × 225 | 63 | 550 | 550 × 550 | 45 | 280 × 280 |
| 60 × 245 | 90 | 650 | 650 × 650 | 66 | 320 × 320 |
| 60 × 320 | 90 | 750 | 750 × 750 | 66 | 400 × 400 |
| 80 × 245 | 110 | 650 | 650 × 650 | 87 | 345 × 345 |
| 90 × 415 | 132 | 1000 | 1000 × 1000 | 100 | 540 × 540 |

Accordingly reader will see that a dimensionally smaller area is required for effecting a swerve of the transporter capsule. In case of the example, the area required is only 400×400 mm whereas it was 750×750 mm in conventional systems for a cylinder capacity of 60×320 mm.

A bending area of 550×550 mm could transport a cylinder capacity of only 39×225 mm in conventional systems, whereas in my system the same bending area can transport a cylinder capacity of over 90×415 mm, which is longer and is larger in diameter as well.

A constriction at the midriff region of the capsule is not needed in my system. The diameter throughout length of the capsule and the diameter of the cargo carrying capacity inside the capsule are only marginally lesser than the internal diameter of the forwarding tube. In a tube of 63 mm diameter, a constricted midriff of 39 mm only could be forwarded in systems hitherto, whereas in my system, a comparable tube diameter of 66 mm forwards a straight cylindrical hollow capsule of uniform 60 mm internal diameter without any constricting midriff, while the length forwarded improves from 225 mm in existing systems to 320 mm in my system.

Unwieldy and unsightly tube bends are also avoided in my system. To cite the example of a cylinder capacity of 60×245 mm, large tube bends of a bend radius of 650 mm have been substituted by a compact swirl chamber of only 320×320 mm overall.

For forwarding a capsule capacity of 60×320 mm, a tube diameter of 90 mm was required in conventional systems, but my system requires a tube of only 66 mm diameter.

Thus it can be seen that this invention favorably affects forwarding capacity, dimensions and costs involved in pneumatic forwarding tube systems.

Components of the device are uncomplicated and can be manufactured at low cost by the plastic moulding or sheet metal and tube industries. Also development costs are therefore low.

While my above description contains many specificities, these should not be construed as limitations on scope of the invention, but rather as exemplification of one preferred embodiment thereof. Many other variations are possible.

For example, in an alternative configuration, swirling of the capsule 15 occurs inside the chamber 16 by a mechanical steering link. In the embodiment, the link grips the capsule 15 after the capsule 15 emerges from tube 11, whereafter the link mechanism swerves the capsule 15 in a swirl to point in the direction of tube 12, and thereafter the link releases the capsule into the tube 12. In another configuration, pushes and pulls are caused to act upon the capsule 15 so as to swirl and swerve the capsule along desired path of the capsule 15 inside the chamber 16, the push and pull forces being applied on the capsule 15 electromagnetically. In another configuration the pushes and pulls are applied magnetically, or alternatively pneumatically. In another configuration, the capsule is steered inside the chamber by means of a combination of mechanical, electromagnetic, magnetic and/or pneumatic forces, the forces being exerted on the capsule by means of air jets, mechanical links, electromagnetic coils and/or by means of magnets located on the chamber and/or on the capsule. Magnitude and duration of the forces can be controlled by means of a microprocessor.

In lieu of the screw caps 19, the system may employ swivel caps, lockable caps or buttoned caps. Parabolic or other functionally apt shapes can substitute for the hemispherical shape of the caps 19. The exterior of the caps 19 can be surfaced with a sheet of rubber or polyurethane and the like. Spring cushions can be envisaged around cargo inside the capsule 15 to absorb shock at the rebound. The deflecting surfaces 13, 18 can be curved surfaces, and also they can be moving at the moment of impact with the cap 19. Angularity of inclination of the surface 13 can be adjustable three dimensionally, so as to obtain a functionally required deflection of the capsule 15 in any direction in a swirl chamber.

A wide choice of materials is available for the tubes 11, 12, the chamber 16 and other components of the system. For example, stainless steel can replace plastics.

I claim:

1. A pneumatic tube forwarding system comprising:

a first tube having a first end and a first central longitudinal axis;

a second tube having a second end and a second central longitudinal axis, said second longitudinal axis being in a same plane as said first longitudinal axis and at an angle to said first longitudinal axis where the angle has an inside of less than 180° and an outside of more than 180°;

an elongate capsule which is moved through said first tube and said second tube, said capsule having an outside diameter portion which closely matches an inside diameter of said first and second tubes, and an end cap at a forward longitudinal end; and a pitch changing member held interposed between said first and second ends of said first and second tubes, said pitch changing member forming a chamber through which said capsule is conducted and including an inside semicylindrical chamber-forming member portion extending between an angularly inside semicylindrical portion of said first end and an angularly inside semicylindrical portion of said second end, an outside semicylindrical chamber-forming member portion extending between an angularly outside semicylindrical portion of said first end and an angularly outside semicylindrical portion of said second end, said outside member portion including (a) a first elongate section having a proximal end abutting said first end of said first tube and a distal end, said first section being generally parallel to said first longitudinal axis, (b) a second elongate section having a proximal end abutting said second end of said second tube and a distal end, said second section being generally parallel to said second longitudinal axis, and (c) a connecting section connecting said distal ends of said first and second sections, said connecting section including (i) an inside impact surface in the chamber at an angle to both said first and second sections, and (ii) an adjusting means for varying an angle of orientation of said impact surface relative to said first and second longitudinal axes, and side walls which connect said inside and outside member portions integrally together;

whereby during transport of said capsule from said first tube to said second tube, said capsule enters said first section of said pitch changing member generally parallel to said first longitudinal axis, said end cap then impacts against said impact surface of said connecting section and is angularly deflected thereby in the chamber, and further movement of said capsule through said pitch changing member causes said capsule to enter said second tube with a pitch generally parallel to said second longitudinal axis.

2. A pneumatic tube forwarding system as claimed in claim 1, wherein said impact surface is a base member having a flat resilient sheet, and said adjusting means adjusts said base member.

3. A pneumatic tube forwarding system as claimed in claim 1, wherein said impact surface has two base members, each one respectively aligned with an intersection of said connecting section and a respective said first or second longitudinal axis.

4. A pneumatic tube forwarding system as claimed in claim 1, wherein said inside member portion is generally arcuately shaped.

5. A pneumatic tube forwarding system as claimed in claim 1, wherein said end cap is rounded, and both ends of said capsule include one said end cap.

6. A pneumatic tube forwarding system as claimed in claim 1, wherein one of said side walls includes a removable panel to provide access to the chamber.

7. A pneumatic tube forwarding system as claimed in claim 3:

wherein said inside member portion is generally arcuately shaped; and wherein said end cap is rounded, and both ends of said capsule include one said end cap.

8. A pneumatic tube forwarding system as claimed in claim 7, wherein one of said side walls includes a removable panel to provide access to the chamber.

9. A pneumatic tube forwarding system comprising:

a first tube having a first end and a first central longitudinal axis;

a second tube having a second end and a second central longitudinal axis, said second longitudinal axis being in a same plane as said first longitudinal axis and at an angle to said first longitudinal axis where the angle has an inside of less than 180° and an outside of more than 180°;

an elongate capsule which is moved through said first tube and said second tube, said capsule having an outside diameter portion which closely matches an inside diameter of said first and second tubes, and an end cap at a forward longitudinal end; and a pitch changing member held interposed between said first and second ends of said first and second tubes, said pitch changing member forming a chamber through which said capsule is conducted and including an inside semicylindrical chamber-forming member portion extending between an angularly inside semicylindrical portion of said first end and an angularly inside semicylindrical portion of said second end, an outside semicylindrical chamber-forming member portion extending between an angularly outside semicylindrical portion of said first end and an angularly outside semicylindrical portion of said second end, said outside member portion including (a) a first elongate section having a proximal end abutting said first end of said first tube and a distal end, said first section being generally parallel to said first longitudinal axis and being longer than said capsule, (b) a second elongate section having a proximal end abutting said second end of said second tube and a distal end, said second section being generally parallel to said second longitudinal axis and being longer than said capsule, (c) a connecting section connecting said distal ends of said first and second sections, and (d) a moving means for moving said end cap away from said first section and toward said second end of said second tube after said capsule exits said first end of said first tube, said moving including (i) an impact surface provided adjacent said connecting section and (ii) an adjusting means for varying an angle of orientation of said impact surface relative to said first and second longitudinal axes, and side walls which connect said inside and outside member portions integrally together;

whereby during transport of said capsule from said first tube to said second tube, said capsule exits said first tube into said first section of said pitch changing member generally parallel to said first longitudinal axis, said end cap is then moved by said moving means towards the second end causing said capsule to change pitch, and further movement of said capsule through said pitch changing member causes said capsule to enter said second tube with a pitch generally parallel to said second longitudinal axis.

10. A pneumatic tube forwarding system as claimed in claim 9, wherein said inside member portion is generally arcuately shaped.

11. A pneumatic tube forwarding system as claimed in claim 9, wherein one of said side walls includes a removable panel to provide access to the chamber.

12. A pneumatic tube forwarding system comprising:

a first tube having a first end and a first central longitudinal axis;

a second tube having a second end and a second central longitudinal axis, said second longitudinal axis being in a same plane as said first longitudinal axis and at an angle to said first longitudinal axis where the angle has an inside of less than 180° and an outside of more than 180°;

an elongate capsule which is moved through said first tube and said second tube, said capsule having an outside diameter portion which closely matches an inside diameter of said first and second tubes, and an end cap at a forward longitudinal end; and a pitch changing member held interposed between said first and second ends of said first and second tubes, said pitch changing member forming a chamber through which said capsule is conducted and including an inside semicylindrical chamber-forming member portion extending between an angularly inside semicylindrical portion of said first end and an angularly inside semicylindrical portion of said second end, an outside semicylindrical chamber-forming member portion extending between an angularly outside semicylindrical portion of said first end and an angularly outside semicylindrical portion of said second end, said outside member portion including (a) a first elongate section having a proximal end abutting said first end of said first tube and a distal end, said first section being generally parallel to said first longitudinal axis, (b) a second elongate section having a proximal end abutting said second end of said second tube and a distal end, said second section being generally parallel to said second longitudinal axis, and (c) a connecting section connecting said distal ends of said first and second sections, said connecting section including an inside impact surface in the chamber at an angle to both said first and second sections, and side walls which connect said inside and outside member portions integrally together, one of said side walls including a removable panel to provide access to the chamber;

whereby during transport of said capsule from said first tube to said second tube, said capsule enters said first section of said pitch changing member generally parallel to said first longitudinal axis, said end cap then impacts against said impact surface of said connecting section and is angularly deflected thereby in the chamber, and further movement of said capsule through said pitch changing member causes said capsule to enter said second tube with a pitch generally parallel to said second longitudinal axis.

13. A pneumatic tube forwarding system as claimed in claim 12:

wherein said inside portion is generally arcuately shaped; and wherein said end cap is rounded, and both ends of said capsule include one said end cap.

14. A pneumatic tube forwarding system comprising:

a first tube having a first end and a first central longitudinal axis;

a second tube having a second end and a second central longitudinal axis, said second longitudinal axis being in a same plane as said first longitudinal axis and at an angle to said first longitudinal axis where the angle has an inside of less than 180° and an outside of more than 180°;

an elongate capsule which is moved through said first tube and said second tube, said capsule having an outside diameter portion which closely matches an inside diameter of said first and second tubes, and an end cap at a forward longitudinal end; and a pitch changing member held interposed between said first and second ends of said first and second tubes, said pitch changing member forming a chamber through which said capsule is conducted and including an inside semicylindrical chamber-forming member portion extending between an angularly inside semicylindrical portion of said first end and an angularly inside semicylindrical portion of said second end, an outside semicylindrical chamber-forming member portion extending between an angularly outside semicylindrical portion of said first end and an angularly outside semicylindrical portion of said second end, said outside member portion including (a) a first elongate section having a proximal end abutting said first end of said first tube and a distal end, said first section being generally parallel to said first longitudinal axis and being longer than said capsule, (b) a second elongate section having a proximal end abutting said second end of said second tube and a distal end, said second section being generally parallel to said second longitudinal axis and being longer than said capsule, (c) a connecting section connecting said distal ends of said first and second sections, and (d) a moving means for moving said end cap away from said first section and toward said second end of said second tube after said capsule exits said first end of said first tube, and side walls which connect said inside and outside member portions integrally together, one of said side walls including a removable panel to provide access to the chamber;

whereby during transport of said capsule from said first tube to said second tube, said capsule exits said first tube into said first section of said pitch changing member generally parallel to said first longitudinal axis, said end cap is then moved by said moving means towards the second end causing said capsule to change pitch, and further movement of said capsule through said pitch changing member causes said capsule to enter said second tube with a pitch generally parallel to said second longitudinal axis.

15. A pneumatic tube forwarding system as claimed in claim 14:

wherein said inside portion is generally arcuately shaped.

* * * * *